Patented July 10, 1951

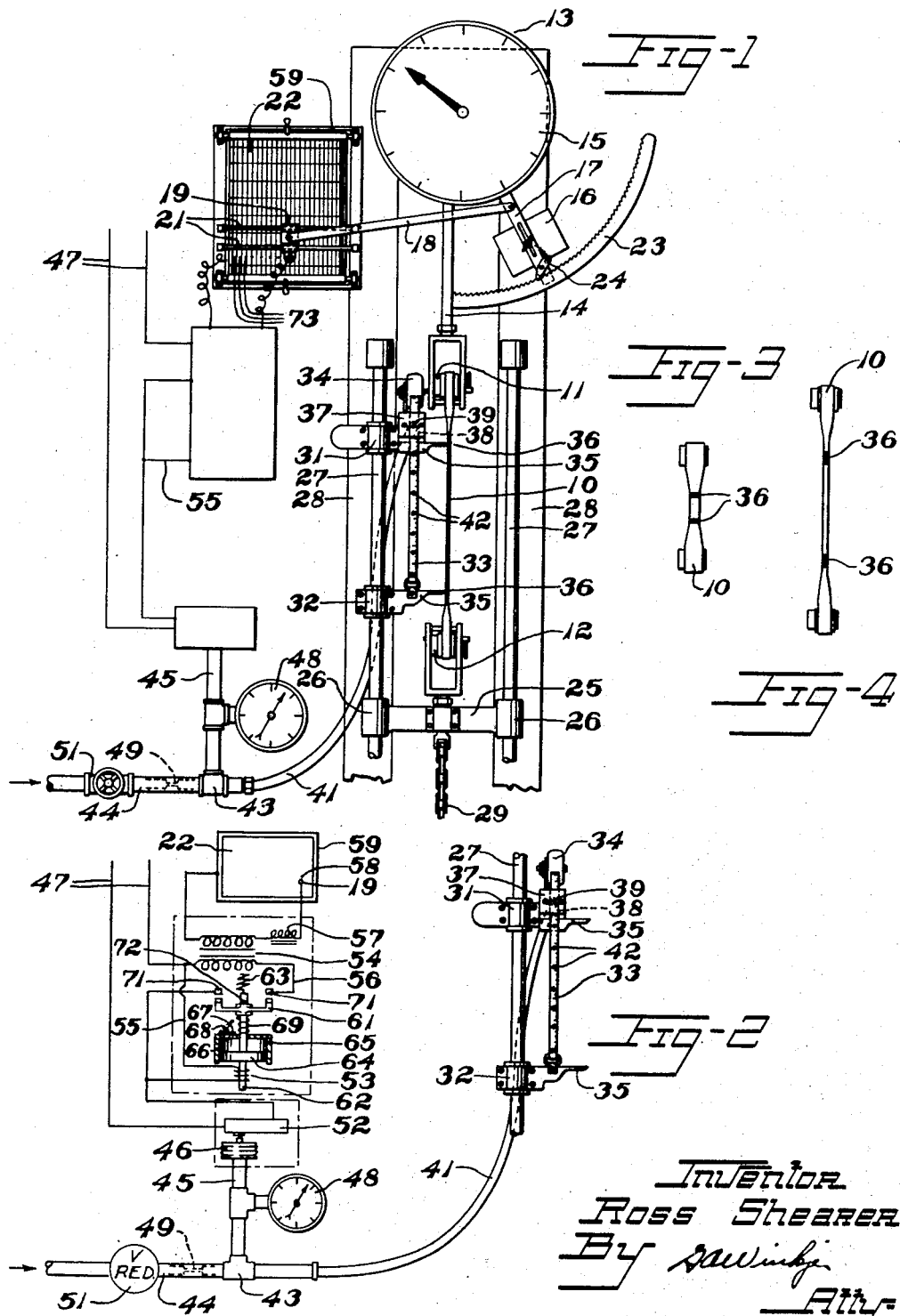

2,560,135

UNITED STATES PATENT OFFICE 2,560,135

TESTING APPARATUS FOR INDICATING
AND RECORDING ELONGATION

Ross Shearer, Akron, Ohio, assignor to The B. F.
Goodrich Company, New York, N. Y., a corporation of New York Application May 2, 1947, Serial No. 745,502

8 Claims. (Cl. 73—89)

This invention relates to measuring and recording apparatus and especially to apparatus for recording the strain of test specimens which are stressed in the testing.

Standard test specimens used in testing rubber or other rubber-like material in tension are usually marked at positions spaced from the ends of the specimen. Heretofore to measure the elongation of a specimen the operator has measured the distance between the marks while the specimen has been stressed which has necessitated careful watching of both marks and a graduated scale. As this has usually been done while the specimen and both its marks were moving, considerable visual and manual skill on the part of the operator has been required to obtain good results.

To record each increment of one hundred percent elongation the operator has manually closed an electrical circuit having a spark gap which has produced a spark and marked a chart. The spark gap has been located between a plate supporting the chart and an indicating arm which has been moved in response to stress upon the specimen in a manner such that the stress on the specimen has been recorded on the chart at the instant of recording the desired elongation. If the circuit was closed for an insufficient period of time the chart was not marked and no record was had but if the circuit was closed for too great a period of time the chart was marked in a manner such that it indicated a range of stresses and did not indicate one definite stress value.

It can be seen that the reliability of tests as heretofore performed has depended largely upon the skill of the operator. The operator has had many duties to perform simultaneously such as measuring the elongation of the moving body, and recording the elongation at the correct instant and in the proper manner. Because of the complexity of the operator's duties the possibility of error has existed.

Objects of the invention are to provide an improved measuring and recording apparatus, to provide simplification of the testing operation, to provide effectively for recording stress-strain measurements and to provide improved reliability of results.

These and further objects will be apparent from the following description, reference being had to the accompanying drawings in which:

Fig. 1 is a front elevation in part diagrammatic of a testing machine constructed in accordance with and embodying the invention, parts being broken away.

Fig. 2 is a view like Fig. 1 of a part of the apparatus.

Fig. 3 is a view of a test specimen in the unstressed position.

Fig. 4 is a view of a test specimen in the stressed condition.

With reference to the drawings the invention is applied to a testing machine of a type shown in Fig. 1 suitable for testing stretchable material such as rubber in tension. A specimen 10 of standard size may be clamped in the machine between upper and lower clamps 11 and 12, respectively.

The upper clamp 11 is connected to a stress measuring gauge 13 by a rod 14. The gauge 13 indicates the stress of the specimen 10 on a dial 15 and has a weight 16 mounted on an arm 17 which is connected to the rod 14 for providing resistance to the downward movement of the rod. As the resistance to elongation of the specimen 10 increases, the arm 17 moves in response thereto. A connecting arm 18 is pivoted to arm 17 and to an indicating member 19 which is mounted slideably on parallel horizontal rods 21, 21 in a manner such that displacement of the arm 17 causes displacement of the indicating member 19.

A chart 22 is mounted adjacent the indicating member 19 and has vertical lines calibrated in a manner such that the indicating member 19 indicates the stress on the specimen 10. To accomodate different size specimens while using the same chart 22 the weight 16 may be slideably adjusted on the arm 17 to provide greater resistance to downward movement of a specimen with a large cross section and less resistance to downward movement of a specimen with a small cross section. A stationary ratchet 23 which is engageable with a pawl 24 mounted on arm 17 is provided to restrain clockwise movement of the arm 17 as seen in Fig. 1, especially upon breakage of the test specimen 10.

The lower clamp 12 is mounted on a cross member 25 which has sleeves 26, 26 mounted on vertical parallel guide rods 27, 27 which are mounted on the testing machine frame 28. A chain 29 is secured to the cross member 25 and connected to a power source such as an electric motor for moving the cross member 25 and lower clamp 12 downward as shown in Fig. 1 to stress the test specimen 10. An upper collar 31 and a lower collar 32 are slideably mounted on one of the guide rods 27, 27. The upper collar supports a displacement measuring member such as tape 33 of metal or other suitable material which may be contained in a casing 34 and is attached at one end to a movable element or trammel 35 which is mounted on the lower collar 32. Each collar has a trammel 35 which extends transversely of the guide rods 27, 27 toward the test specimen 10 and may be used to follow the movement of one of the marks 36, 36 upon elongation of the test specimen.

In accordance with the invention provision is made for effectively recording increments of change in elongation of the test specimen. A fluid pressure altering member 37 is mounted on the upper collar 31 and has a slot 38 adapted to receive the tape 33 and permit vertical movement of the tape therein. The member 37 has an orifice or aperture 39 which opens on a slot 38 and at the back of th tape is coincident with the end opening of a flexible air conducting hose 41 which is mounted on the member 37. The aperture 39 may be closed and the flexible hose opening effectively sealed by inserting a continuous portion of the tape 33 in the slot 38 and over the aperture. To open the aperture 39 at the desired relative position of the trammels 35, 35 the tape 33 may have discontinuous portions at spaced-apart positions longitudinally thereof such as perforations 42, 42 which coincide with the aperture at the desired positions.

The flexible hose 41 may be connected to a T junction 43 to which air under perssure is supplied by a conduit 44. Also connected to the hose 41 by the T junction 43 is a conduit 45 which supplies air to a bellows 46. The bellows 46 is disposed in a position such that it will close or open an electrical circuit 47 with a change in air pressure in the bellows 46. An air pressure gauge 48 may be connected to the conduit 45 to indicate the pressure at the bellows 46. A fluid pressure restricting member such as orifice 49 may be inserted in the conduit 44 to limit the rate at which air is supplied to the T junction 43 and if necessary a reduction valve 51 may be interposed between the orifice 49 and the source of air to reduce the air pressure at the T junction 43.

The bellows 46 is disposed in such a position that upon change of air pressure the bellows moves and actuates a suitable switch such as a micro-switch 52 which opens and closes a spark producing electrical circuit 47. In the circuit 47 a solenoid coil 53 and a primary coil of a transformer 54 are connected in parallel circuits 55 and 56, respectively. A secondary coil of the transformer 54 may be connected in series with a spark coil 57 and a spark gap 58 which produces a spark when the transformer is energized. The spark gap 58 is located between a metal plate 59 upon which the chart 22 is mounted and the indicating member 19.

A delay action switch is provided in the transformer circuit 56 for regulating the duration of the sparking at the spark gap 58. A connecting arm 61 of the switch is slideably mounted on a shaft 62 which may be moved by energizing the solenoid coil 53 as shown in Fig. 2. The shaft 62 is connected to a spring 63 at the upper end thereof which tends to urge the shaft upward. The shaft 62 is connected to a piston 64 which is inserted in a cylinder 65. The cylinder 65 has an aperture 66 opening on the closed end of the cylinder which may be covered by a flap 67 which is hinged in a manner such that upward movement of the shaft 62 is relatively unimpeded as the flap 67 may swing up to a position such as is shown in dotted lines in Fig. 2 and allows air from the cylinder to flow from the aperture 66. The flap 67 has a small aperture 68 to retard downward movement of the shaft 62. When the solenoid coil 53 is energized it urges the shaft 62 downward at which time the flap 67 swings downward over aperture 66 and the downward movement of the shaft 62 is retarded by the slow rate at which air may enter the cylinder through the small aperture 68.

The slideable connecting arm 61 is urged upward on shaft 62 by a spring 69 seated on the cylinder 65. At the position shown in Fig. 2, the arm 61 is prevented from connecting contacts 71, 71 by a pin 72 through the shaft 62. When the shaft 62 is in the uppermost position the connecting arm 61 engages the contacts 71, 71 and the pin 72 is above the connecting arm. As the shaft 62 descends the connecting arm 61 maintains contact with the contacts 71, 71 until the pin 72 engages the arm at which time the connecting arm is urged downward breaking contact with the contacts 71, 71 with a minimum of arcing.

In the operation of the apparatus embodying the invention, test specimens 10 such as shown in Figs. 3 and 4 may be used. The specimens 10 are made with a middle section of smaller cross section than the end portions which is desirable for obtaining good test results. When using specimens 10 with this dumbell shape the clamp separation is not directly related to elongation of the section of the specimen that has the small cross section. For this reason gauge marks 36, 36 are placed on the specimen and must be followed by trammels 35, 35 to measure the elongation. The elongation is usually recorded at each one hundred percent elongation of the specimen and therefore the tape 33 may be perforated in a manner such that as each one hundred percent elongation of the specimen 10 is measured by the trammels 35, 35 one of the perforations 42, 42 will be in alignment with the aperture 39 in the member 37. When the tape 33 closes the aperture 39 of the member 37 the air pressure in the hose 41 and in the bellows 46 is maintained, the bellows 46 is expanded and the microswitch 52 opens the main circuit 47. With the main circuit 47 in the open position no current flows and there is no sparking to mark the chart 22.

When a perforation 42 in the tape 33 is aligned with the aperture 39 in the member 37 air escapes from the hose 41 and lowers the air pressure at the bellows 46. With the reduction in pressure the bellows 46 is deflated and actuates the micro-switch 52 which closes the main circuit 47. Closing the circuit 47 energizes the circuit 56 containing the transformer 54 and the primary and secondary coils of the transformer 54 are energized and cause sparking at the spark gap 58 which marks the chart 22.

The circuit 55 containing the solenoid coil 53 is also energized and the coil 53 is energized and tends to move the shaft 62 downward. This movement is retarded by the piston 64, movement of which is dependent upon the passage of air into the cylinder 65 through the small aperture 68 in the flap 67. As the piston 64 moves downward the shaft 62 descends and carries with it pin 72 which upon engagement with the connecting arm 61 breaks the circuit 56 containing the transformer 54 and terminates the spark.

It can be seen that the duration of the sparking depends upon the size of the small aperture 68 in the flap 67. If the size of the small aperture 68 is increased, the sparking time will be decreased and if the size of the aperture 68 is decreased the duration of the sparking will be increased.

In Fig. 2 the shaft 62 is shown in the position after the circuit 56 containing the transformer 54 has been broken. The shaft 62 will remain in this position as long as the main circuit 47 is closed and will not connect the contacts 71, 71 until the circuit 47 is opened.

During the period of time that the aperture 39 in the member 37 is open the air pressure remains low and maintains the collapsed position of the bellows 46 as the restricting orifice 49 in the conduit 44 which supplies air to the T joint 43 will admit a smaller amount of air than is expelled at the aperture of the slotted member.

When the trammels 35, 35 are moved apart upon further elongation of the specimen 10 the tape 33 is moved in the slot 38 and the perforations 42, 42 are moved out of alignment with the aperture 39 in the member 37. The tape 33 then blocks the aperture 39 causing the air pressure to increase and the bellows 46 to expand. Expansion of the bellows 46 actuates the microswitch 52 which opens the main circuit 47. Upon the opening of the main circuit 47 the solenoid coil 53 is de-energized and permits the spring 63 to move the shaft upward and allows the connecting arm 61 to move into contact with the contacts 71, 71.

When urged upward by the spring 63 the movement of the shaft 62 is faster than the downward movement as the flap 67 on the cylinder 65 swings upward and allows the air in the cylinder to escape through the aperture 66. In this manner the circuit 56 containing the transformer 54 is closed when the main circuit 47 is open so that sparking will occur simultaneously with the closing of the main circuit upon reduction of the air pressure in the bellows 46.

Upon failure of the specimen 10 the operator may read the total amount of elongation from tape 33 at the upper trammel 35. The stress at the time of failure may be recorded on the chart 22 by moving the trammel 35 to a position at which a perforation 42 in the tape 33 is in alignment with the aperture 39 in the slotted member 37. This releases the air pressure in the bellows 46 and causes sparking between the indicating member 19 and the backing plate 59 for marking of the chart 22. The indicating member 19 indicates the stress at the time of breakage as the arm 17 to which it is linked by the connecting arm 18 is held in that position by the pawl 24 engaging the ratchet 23 at the uppermost position as seen in Fig. 1. After the total elongation as read on the tape has been entered upon the chart a complete and accurate record of the stress at specific elongations and at failure is had for the specimen 10 tested as shown in Fig. 1 by indications 73, 73.

During the elongating of the specimen 10 the operator need only concentrate his attention on keeping the trammels 35, 35 on the marks 36, 36. He is relieved of other operations such as measuring the elongation with a scale and manipulating devices to indicate increments of elongation. In the construction described, moreover, a good spark indication is made certain without requiring that the operator exercise a high degree of care in the speed with which he moves the trammels 35, 35 and the tape 33.

Variations may be made without departing from the scope of the invention as it is defined in the following claims.

I claim:

1. Apparatus for recording stress-strain relationship in a test specimen, said apparatus comprising means for subjecting said specimen to progressive strain, means responsive to change in the strain for recording changes in the stress, fluid pressure means for actuating the recording means to indicate the stress at determinate increments of strain, means for following change in strain of the specimen including a displacement measuring member having fluid pressure releasing means at spaced-apart positions along the same, said fluid pressure releasing means being mounted for response to such change at determinate increments of strain for actuating said fluid pressure means to intermittently operate said recording means.

2. Apparatus as claimed in claim 5 in which the recording means comprises a spark producing electrical circuit for recording changes in stress and strain, and in which said electrical circuit contains delay action switch means for recording in intermittent intervals of regulated duration.

3. Apparatus for recording stress-elongation relationship in a test specimen, said apparatus comprising means for subjecting said specimen to progressive elongation, a chart, an indicating arm responsive to change in stress of the specimen for indicating the stress elongation values upon said chart, a spark producing circuit for causing a spark to pass between said arm and said chart for marking said chart, means for measuring elongation of said specimen comprising a pair of movable elements for following marks on said specimen, a displacement measuring member having fluid pressure releasing means at spaced-apart positions along the same and being mounted on one of said elements, fluid pressure means for closing said spark producing circuit comprising a fluid pressure actuating member mounted on the other of said elements in operative engagement with said displacement measuring member and responsive to contact with said fluid pressure actuating means upon relative movement of said displacement measuring member for actuating said circuit at determinate increments of elongation to operate said indicating means and delay action switch means for recording in intermittent intervals of regulated duration.

4. Apparatus for recording stress-elongation relationship in a test specimen, said apparatus comprising means for subjecting said specimen to progressive elongation, a chart, an indicating arm responsive to change in stress of the specimen for indicating the stress-elongation values upon said chart, a spark producing circuit for causing a spark to pass between said arm and said chart for marking said chart, said circuit containing delay action switch means for recording in intermittent intervals of regulated duration, fluid pressure means for closing said spark producing circuit, means for measuring elongation of said specimen comprising a pair of movable elements for following marks on said specimen, a tape mounted on one of said elements, fluid pressure altering means including an orifice mounted on the other of said elements, said tape being interrupted at spaced-apart intervals along the same by perforations, and said orifice being located in the actuating relation to said perforations for actuating said fluid pressure means at determinate increments of elongation to indicate the stress-elongation values on said chart.

5. Apparatus for recording the relative displacement of a pair of elements, said apparatus comprising a source of fluid, a member affixed to one of said elements and having an orifice connected to said source of fluid, a member affixed to the other of said elements and disposed in a position for obstructing said orifice, said last-mentioned member having perforations at spaced-apart positions located in actuating relation to said orifice for opening and closing said orifice at determinate increments of displacement of said elements and fluid operated recording means comprising a spark producing electrical circuit containing delay action switch means for recording in intermittent intervals of regulated duration in response to opening and closing of said orifice.

6. Apparatus for indicating the relative displacement of a pair of elements, said apparatus comprising a source of fluid pressure having an orifice affixed to one of said elements, a displacement measuring member affixed to the other of said elements and disposed in a position for closing said orifice, said displacement measuring member having perforations at spaced-apart positions located in actuating relation to said orifice for opening said orifice and releasing the fluid pressure at determinate increments of displacement of said elements, fluid pressure operated indicating means and fluid pressure means for actuating said fluid pressure operated indicating means responding to release of fluid pressure at said orifice, and said fluid pressure operated indicating means comprising a spark producing electrical circuit containing delay action switch means for indicating in intermittent intervals of regulated duration in response to release of fluid pressure at said orifice and actuation by said fluid pressure operated indicating means.

7. Apparatus for recording stress-strain relation in a test specimen, said apparatus comprising means for subjecting the specimen to change of length, an indicating element mounted for movement along the specimen to follow the position of a mark on the specimen, a second indicating element mounted for movement along the specimen to follow the position of a second mark on the specimen spaced from the first mark, a tape element connected to the first said indicating element and mounted for movement adjacent to and relative to said second indicating element, said tape having a series of apertures distributed along the length thereof, pressure fluid conducting means having an apertured element associated with said second indicating means and positioned for obstruction by said tape and intermittent exposure by the apertures in the tape and means for registering pressure changes in said fluid conducting means occurring at successive alignments of the apertures in said tape with said apertured element.

8. Apparatus for recording stress-strain relation in a test specimen, said apparatus comprising means for subjecting the specimen to change of length, an indicating element mounted for movement along the specimen to follow the position of a mark on the specimen, a second indicating element mounted for movement along the specimen to follow the position of a second mark on the specimen spaced from the first mark, a tape element connected to the first said indicating element and mounted for movement adjacent to and relative to said second indicating element, said tape having a series of apertures distributed along the length thereof, pressure fluid conducting means having an apertured element associated with said second indicating means and positioned for obstruction by said tape and intermittent exposure by the apertures in the tape, a chart, an indicating arm mounted for movement adjacent said chart in response to change in stress in the specimen, a spark producing circuit for causing a spark to pass between said arm and said chart, and means for operating said spark producing circuit in response to pressure changes in said fluid conducting means occurring at successive alignments of the apertures in said tape with said apertured element.

ROSS SHEARER.

REFERENCES CITED

The following references are of record in the file of this patent:

UNITED STATES PATENTS

| Number | Name | Date |
|---|---|---|
| 399,549 | Olsen | Mar. 12, 1889 |
| 1,125,236 | Whiting | Jan. 19, 1915 |
| 1,656,246 | Stevenson | Jan. 17, 1928 |
| 1,679,751 | Stevenson | Aug. 7, 1928 |
| 1,768,512 | De Leeuw | June 24, 1930 |
| 1,985,576 | Mennesson | Dec. 25, 1934 |
| 2,244,864 | Witham, Jr. | June 10, 1941 |
| 2,358,769 | Aller | Sept. 19, 1944 |
| 2,375,600 | Wattebot | May 8, 1945 |
| 2,455,285 | Versaw | Nov. 30, 1948 |

FOREIGN PATENTS

| Number | Country | Date |
|---|---|---|
| 87,779 | Switzerland | Apr. 16, 1921 |
| 883,333 | France | Mar. 22, 1943 |

Certificate of Correction

Patent No. 2,560,135                          July 10, 1951

ROSS SHEARER

It is hereby certified that error appears in the printed specification of the above numbered patent requiring correction as follows:

Column 3, line 12, for "th" read *the*; column 6, line 13, for the claim reference numeral "5" read *1*; column 7, line 17, for "mesauring" read *measuring*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*